(12) United States Patent
White et al.

(10) Patent No.: US 12,449,013 B2
(45) Date of Patent: Oct. 21, 2025

(54) SLACK ADJUSTER ASSEMBLY FOR HEAVY-DUTY VEHICLES

(71) Applicant: Hendrickson USA, L.L.C., Schaumburg, IL (US)

(72) Inventors: Jay D. White, Lenoir, NC (US); Dhawal P. Dharaiya, Twinsburg, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 353 days.

(21) Appl. No.: 17/973,602

(22) Filed: Oct. 26, 2022

(65) Prior Publication Data

US 2023/0134041 A1     May 4, 2023

Related U.S. Application Data

(60) Provisional application No. 63/275,629, filed on Nov. 4, 2021.

(51) Int. Cl.
*F16D 65/54*     (2006.01)

(52) U.S. Cl.
CPC .................................. *F16D 65/546* (2013.01)

(58) Field of Classification Search
CPC .......... B60T 17/22; F16D 51/22; F16D 65/22; F16D 65/38; F16D 65/546; F16D 66/00; F16D 66/025; F16D 66/027; F16D 2125/30; F16D 2125/32; F16D 2066/003; F16D 2066/005
USPC ....................................................... 188/79.63
See application file for complete search history.

(56) References Cited

U.S. PATENT DOCUMENTS

| | | | | |
|---|---|---|---|---|
| 3,507,369 | A | * | 4/1970 | Oliver .................... F16D 65/60 188/79.55 |
| 3,776,329 | A | * | 12/1973 | Hope ...................... F16D 65/22 188/1.11 R |
| 3,997,036 | A | | 12/1976 | Zeidler |
| 4,114,733 | A | | 9/1978 | Knight |
| 4,380,276 | A | | 4/1983 | Sweet et al. |
| 4,499,978 | A | * | 2/1985 | Norcross ................ F16D 65/50 188/79.55 |
| 4,838,389 | A | | 6/1989 | Mamery |
| 5,253,735 | A | * | 10/1993 | Larson ................. F16D 66/025 324/207.2 |

(Continued)

FOREIGN PATENT DOCUMENTS

| | | | |
|---|---|---|---|
| CN | 103443497 | 12/2013 | |
| WO | WO-9641970 A1 * | 12/1996 | ............. F16D 65/60 |

(Continued)

*Primary Examiner* — Robert A. Siconolfi
*Assistant Examiner* — San M Aung
(74) *Attorney, Agent, or Firm* — Dureska & Moore, LLC; David P. Dureska; Benjamin J. Chojnacki

(57) ABSTRACT

A slack adjuster assembly for use in a heavy-duty vehicle drum brake system, the slack adjuster assembly comprising a slack adjuster, an inboard sealing assembly, and a sensor arrangement. The slack adjuster is mounted on an inboard end of a camshaft of the drum brake system. The inboard sealing assembly sealingly engages with an inboard side of the slack adjuster. The sensor arrangement measures rotation of the camshaft and is at least partially disposed within the inboard sealing assembly to protect the sensor arrangement from impact damage, water, chemicals, and debris.

21 Claims, 5 Drawing Sheets

(56) References Cited

U.S. PATENT DOCUMENTS

| | | | |
|---|---|---|---|
| 5,350,043 | A | 9/1994 | Crewson et al. |
| 6,213,264 | B1 | 4/2001 | Walker et al. |
| 6,240,806 | B1 | 6/2001 | Morris et al. |
| 6,450,302 | B1 | 9/2002 | Lyons |
| 9,447,832 | B2 | 9/2016 | Todd et al. |
| 9,605,724 | B2 | 3/2017 | Okuma |
| 10,197,123 | B2 | 2/2019 | Drake |
| 2005/0061589 | A1* | 3/2005 | Jones ............... F16D 51/00 188/79.55 |
| 2006/0033382 | A1 | 2/2006 | Steph et al. |
| 2007/0140782 | A1* | 6/2007 | Morris ............ F16B 17/006 74/567 |
| 2011/0241866 | A1* | 10/2011 | Todd ............... B60T 17/088 701/31.4 |
| 2012/0080573 | A1* | 4/2012 | Fulton ............. B23P 11/00 29/428 |
| 2014/0147194 | A1* | 5/2014 | Fulton ............ B60T 17/088 403/270 |
| 2015/0377311 | A1* | 12/2015 | Okuma ............ F16D 65/22 188/1.11 E |
| 2017/0038000 | A1* | 2/2017 | Füchsle ........... B60T 17/22 |

FOREIGN PATENT DOCUMENTS

| | | |
|---|---|---|
| WO | 2014150551 | 9/2014 |
| WO | 2020236391 | 11/2020 |

\* cited by examiner

SLACK ADJUSTER ASSEMBLY FOR HEAVY-DUTY VEHICLES

CROSS-REFERENCE TO RELATED APPLICATION

This application claims the benefit of U.S. Provisional Patent Application No. 63/275,629, filed Nov. 4, 2021.

BACKGROUND OF THE INVENTION

FIELD OF THE INVENTION

The present invention relates generally to the art of braking systems. In particular, the present invention relates to braking systems for heavy-duty vehicles that utilize drum brakes. More particularly, the present invention relates to a slack adjuster assembly for use in heavy-duty vehicle drum brake systems that measures S-cam rotation utilizing a sensor arrangement mounted within an inboard sealing assembly of the slack adjuster, thereby providing a sensor arrangement that is protected from water, chemicals, and/or debris and minimally disruptive to assembly and maintenance of the drum brake system.

BACKGROUND ART

The use of braking systems on heavy-duty vehicles is well-known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include disc brake systems and drum brake systems.

Drum brake systems are generally incorporated into an axle/suspension system and typically include a brake drum mounted on a wheel hub of a wheel end assembly rotatably mounted on an outboard end of the axle. The brake drum typically includes a pair of brake shoes housed within the brake drum. Each brake shoe has a sacrificial, high coefficient of friction brake lining that is mounted on a metal backing plate, or shoe table, and maintained in a radially-spaced relationship from an interior braking surface of the brake drum. An S-cam attached to the outboard end of a camshaft of a cam shaft assembly of the drum brake system engages a pair of rollers, each roller being connected to an end of a respective brake shoe.

Drum brake systems also include a prior art slack adjuster assembly. Prior art slack adjuster assemblies typically include a slack adjuster attached to the inboard splined end of the camshaft. The slack adjuster establishes a rotation reference point for an automatic adjustment mechanism, such as a control arm operatively connected to the axle/suspension system, as is known. The automatic adjustment mechanism of the prior art slack adjuster assembly indexes the camshaft rotation from the rotation reference point in order to maintain a preset distance or clearance between the brake lining of the brake shoes and the interior braking surface of the brake drum, regulating the stroke and mechanical force of a brake air chamber necessary to slow or stop the heavy-duty vehicle.

During operation when the drum brake system is actuated, compressed air is communicated from an air supply source, such as a compressor and/or air tank, through air conduits or lines to a brake chamber, as is known. The brake chamber converts the air pressure into mechanical force and moves a pushrod. The pushrod, in turn, moves the slack adjuster of the prior art slack adjuster assembly, which causes rotation of the camshaft and S-cam. The S-cam forces the brake shoes radially outward such that the brake linings contact the interior braking surface of the brake drum, creating friction and slowing or stopping the heavy-duty vehicle. The prior art slack adjuster assembly indexes the rotation of the camshaft when the drum brake system is actuated. Once the drum brake system is released or no longer actuated, the camshaft, and thus the S-cam, rotates back, allowing the radially-spaced relationship between the brake lining and interior braking surface of the brake drums to be re-established. The slack adjuster rotates back to a new position based on the indexed rotation of the cam shaft, thereby maintaining the preset distance or clearance between the brake lining and the interior braking surface of the brake drum.

In order to facilitate maintenance, increase efficiency, and provide information regarding potential problems or issues of the drum brake system related to the slack adjusters, brake air chambers, and/or other components, prior art slack adjuster assemblies may incorporate one or more prior art sensor arrangements. Prior art sensor arrangements utilize sensors that may alert a fleet or operator of the heavy-duty vehicle to potential brake actuation issues. In particular, prior art sensor arrangements have utilized sensors that provide information allowing prediction of maintenance and/or replacement of slack adjusters, brake air chambers, air system components, worn brake shoes and/or drum linings, and/or other components before the condition potentially impacts safety or performance of the drum brake system.

More particularly, prior art sensor arrangements have been utilized to measure the stroke of the brake air chamber or, because rotation of the S-cam is proportional to the brake air chamber stroke, rotation of the camshaft. Prior art sensor arrangements generally utilize external components attached to the slack adjuster or the camshaft or internal components incorporated into and disposed within the slack adjuster. In particular, numerous types of slack adjusters from numerous manufacturers have been designed to be compatible with the splined interface on the inboard end of the camshaft. More particularly, some manufacturers of slack adjusters incorporate proprietary sensors into the slack adjuster. In addition, third-party sensors are available that can be adapted to fit with specific commercially available slack adjusters. Alternatively, prior art sensor arrangements have used components attached to the head of the S-cam and disposed within the brake drum. Some prior art sensors may even attach directly to a modified inboard end of a camshaft or may be attached to the axle or other components of the suspension system using commercially available brackets.

Prior art slack adjuster assemblies with prior art sensor arrangements, while adequate for the intended purpose, have potential disadvantages, drawbacks, and limitations. For example, prior art sensor arrangements are generally located or positioned in areas exposed to potential impacts and/or harsh environmental conditions, such as extreme temperatures, water, chemicals, and/or debris. As a result, prior art sensor arrangements may potentially be damaged or experience reduced accuracy and/or service-life, requiring more frequent maintenance and/or replacement, thereby increasing cost. In addition, prior art sensor arrangements are located or positioned in areas that interfere with or add complexity to maintenance, assembly, disassembly, and reassembly of the drum brake system and heavy-duty vehicle. As a result, use of prior art sensor arrangements with prior art slack adjuster assemblies may potentially increase heavy-duty vehicle down-time and cost of maintenance and assembly of the drum brake system.

Thus, there is a need in the art for an improved slack adjuster assembly that provides a sensor arrangement for monitoring camshaft rotation that can be utilized without regard to slack adjuster manufacturer; is minimally disruptive and/or does not add complexity to maintenance and assembly of the drum brake system; and provides an inboard sealing assembly that maintains lubrication of the slack adjuster and camshaft while protecting the sensor arrangement from potential impact damage, extreme temperatures, water, chemicals, and/or debris, thereby increasing the maintenance interval and service-life of the sensor arrangement and slack adjuster assembly and reducing heavy-duty vehicle down time.

SUMMARY OF THE INVENTION

Objectives of the present invention include providing a slack adjuster assembly with a sensor arrangement that monitors camshaft rotation and can be utilized without regard to slack adjuster manufacturer.

A further objective of the present invention is to provide a slack adjuster assembly with a sensor arrangement that monitors camshaft rotation and is minimally disruptive and/or does not add complexity to assembly and maintenance of the drum brake system.

Yet another objective of the present invention is to provide a slack adjuster assembly with an inboard sealing assembly that maintains lubrication of the slack adjuster and protects the sensor arrangement from potential impact damage, extreme temperatures, water, chemicals, and/or debris.

These objectives and advantages are obtained by the slack adjuster assembly, according to the present invention, for use in a heavy-duty vehicle drum brake system, the slack adjuster assembly comprising a slack adjuster, an inboard sealing assembly, and a sensor arrangement.

The slack adjuster is mounted on an inboard end of a camshaft of the drum brake system. The inboard sealing assembly sealingly engages with an inboard side of the slack adjuster. The sensor arrangement measures rotation of the camshaft and is at least partially disposed within the inboard sealing assembly to protect the sensor arrangement from impact damage, water, chemicals, and debris.

BRIEF DESCRIPTION OF THE SEVERAL VIEWS OF THE DRAWINGS

The preferred embodiments of the present invention, illustrative of the best mode in which applicants have contemplated applying the principles, is set forth in the following description, shown in the drawings, and particularly and distinctly pointed out and set forth in the appended claims.

DESCRIPTION OF THE PREFERRED EMBODIMENT

Figure 1:
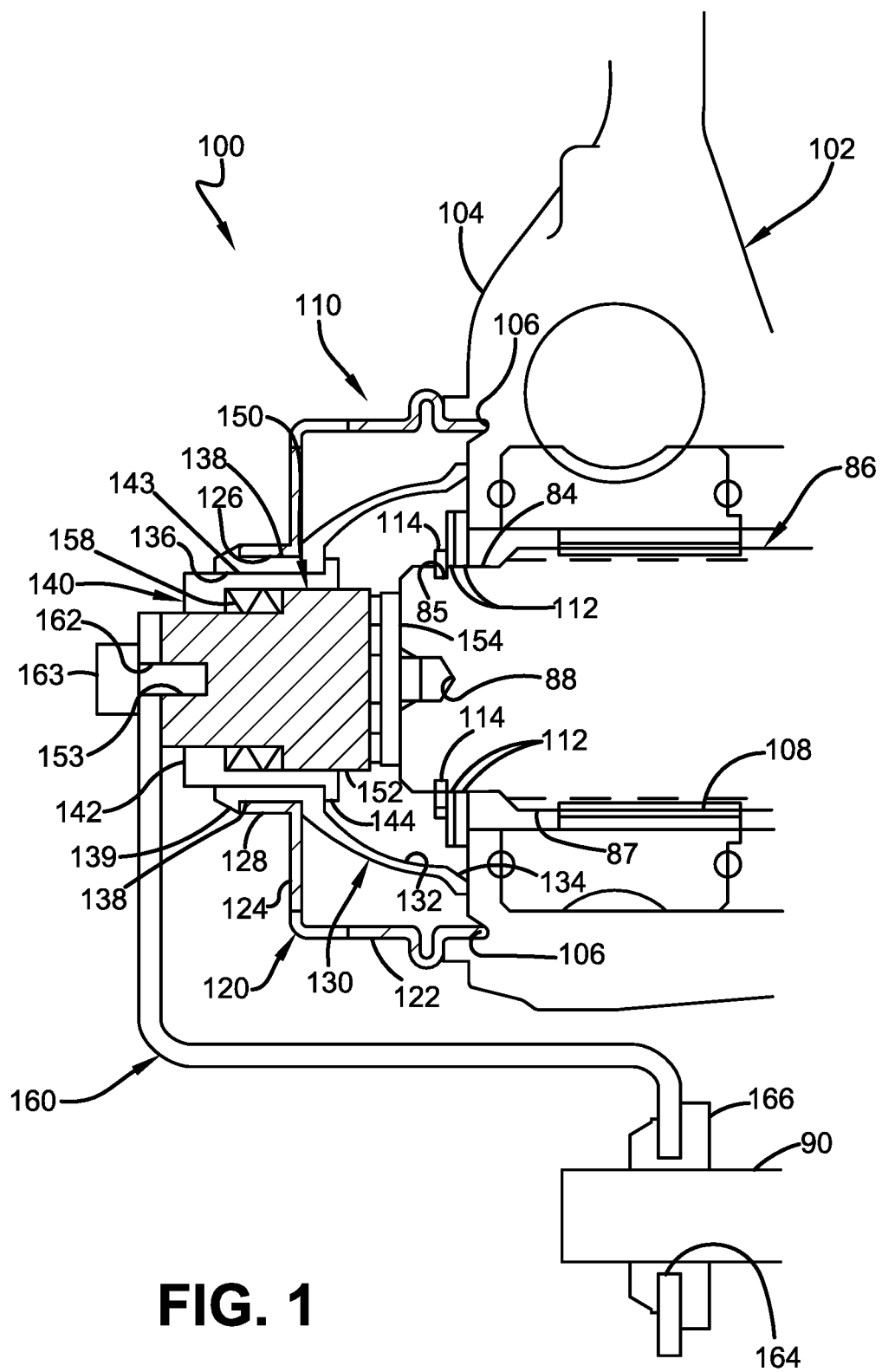
FIG. 1 is a fragmentary elevational view, in section, of an exemplary embodiment slack adjuster assembly, according to the present invention.
Figure 2:
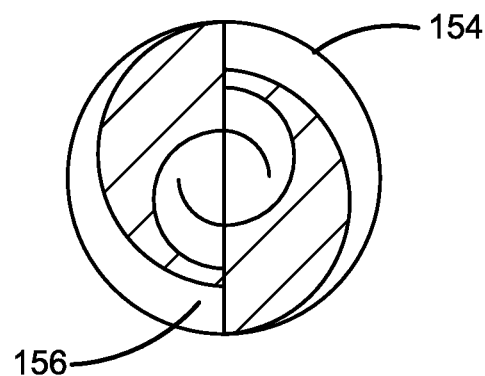
FIG. 2 is an elevational view, looking axially outboard, of a portion of the slack adjuster assembly shown in FIG. 1, showing an inboard surface of a target of the sensor arrangement.
Figure 3:
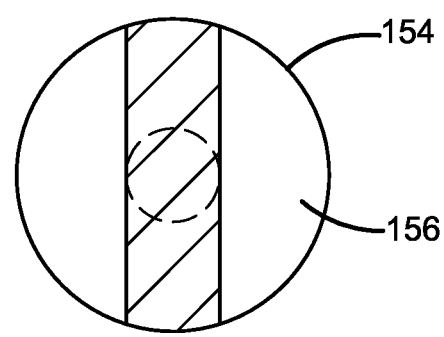
FIG. 3 is an elevational view, looking axially outboard, of a portion of the slack adjuster assembly shown in FIG. 1, showing an inboard surface of an alternative configuration of the target of the sensor arrangement.

An exemplary embodiment slack adjuster assembly 100 (FIGS. 1-3), according to the present invention, may be incorporated into any drum brake system (not shown), including those utilizing a cam tube assembly (not shown). More specifically, slack adjuster assembly 100 may be mounted on a camshaft 86 (partially shown) of a drum brake system. Slack adjuster assembly 100 includes a slack adjuster 102, an inboard sealing assembly 110, and a sensor arrangement 150. Slack adjuster 102 includes a body 104 having an internal spline 108 for receiving an external spline 87 of an inboard end 84 of camshaft 86, as is known.

Inboard sealing assembly 110 abuts and/or is sealingly engaged with the inboard side of slack adjuster 102. Inboard sealing assembly 110 includes one or more washers 112 and a snap ring or E-clip 114. Washers 112 may be disposed about inboard end 84 of camshaft 86 and located adjacent slack adjuster 102 and outboardly of a groove 85 formed into the camshaft, as is known. E-clip 114 is snapped onto, or disposed about, inboard end 84 of camshaft 86 inboardly of washers 112. More particularly, E-clip 114 mechanically engages inboard end 84 of camshaft 86 such that the E-clip is disposed within groove 85. E-clip 114 acts as a retaining ring to limit the amount of axial movement of washers 112, slack adjuster 102, and camshaft 86.

In accordance with an important aspect of the present invention, inboard sealing assembly 110 also includes a seal 130 disposed over inboard end 84 of camshaft 86 and in contact with body 104 of slack adjuster 102 to form a 360-degree seal on the inboard side. Seal 130 is formed from a flexible elastomeric material, such as rubber, with a generally bell- or cup-shape forming an inboardly extending recess or concavity 132 having a central opening 136 at the extremity of the concavity. An annular flange or projection 138 may be formed about and extend axially inboard from opening 136 of seal 130. In addition, a large-diameter flap or lip 134 is formed about the outboard edge of concavity 132 and is in contact with a coverplate (not shown) or body 104 of slack adjuster 102 to form a 360-degree seal about the inboard side of the slack adjuster. As a result, pressurized grease may pool within concavity 132 as it flows between internal and external splines 108, 87 of slack adjuster 102 and camshaft 86, respectively, and through washers 112 and E-clip 114 to form a grease reservoir about and adjacent to sensor arrangement 150 and components of slack adjuster assembly 100 to protect the sensor arrangement and other components from water, chemicals, and/or debris and to prevent wear and corrosion. The large diameter of lip 134 combined with the flexible elastomer of seal 130 allows the lip to be displaced or deflected away from body 104. More specifically, in the event grease overfills concavity 132, lip 134 may deflect radially outwardly and inboardly away from slack adjuster 102, allowing excess grease to be purged from the concavity. The bell- or cup-shape of seal 130 combined with the flexible elastomer material of the seal also prevents the seal from pulling a vacuum on concavity 132 or pressurizing the concavity in the event axial movement of camshaft 86 occurs during braking. More particularly, in the event of axial movement of camshaft 86 during braking, seal 130 may flex, compensating for any volume changes within concavity 132, thereby preventing suction of water, chemicals, and/or other debris past lip 134 into the concavity as well as preventing increased pressure from purging the grease out of the concavity.

Inboard sealing assembly 110 also includes a cover 120 disposed over or at least partially about seal 130. Cover 120 may be formed with any suitable shape, such as tubular, stepped or graduated, from any suitable material, such as steel, plastic, or composite, using any suitable process, such as stamping. In particular, cover 120 may be formed with a generally tubular outboard section 122 and an inboard flange 124. Outboard section 122 may mechanically engage with the inboard side of slack adjuster 102. More specifically, outboard section 122 may be press-fit into an annular recess 106 formed into a coverplate (not shown) or the inboard side of body 104 of slack adjuster 102. It is contemplated that any other suitable means of connection or attachment may be used between cover 120 and slack adjuster 102, such as a threaded connection. Inboard flange 124 extends radially inward from outboard section 122. An annular flange or collar 128 may be formed continuous with and extending axially-inboard from inboard flange 124 such that the collar is radially offset from and concentric with or parallel to outboard section 122. Collar 128 includes a central opening 126 extending through the collar of cover 120. The inner diameter of collar 128 generally corresponds to and is greater than or equal to the outer diameter of projection 138 of seal 130. It is contemplated that cover 120 may also include a plurality of vents (not shown) formed through flange 124 and/or outboard section 122 and having a suitable size and/or shape to provide protection to seal 130 and sensor arrangement 150 from damage potentially caused by power washers while also allowing pressure equalization between the interior and exterior of the cover. As a result, air and/or grease may be purged from concavity 132 of seal 130 without creating back pressure, and water, chemicals, and/or debris may drain from cover 120, preventing collection inside the cover.

Cover 120 may be connected to or engage with seal 130. In particular, at least a portion of projection 138 of seal 130 may be disposed at least partially within and/or through opening 126 and/or mechanically engage collar 128 of cover 120. More particularly, projection 138 may include a radially-outward extending lip 139 that mechanically engages the inboard edge of collar 128 of cover 120 to prevent relative axial movement between seal 130 and the cover, securing the seal within the cover. It is also contemplated that any other suitable method may be used to connect or engage seal 130 with cover 120, such as adhesive. Engagement of seal 130 to cover 120 may facilitate control and adjustment of the contact pressure of lip 134 against the inboard side of slack adjuster 102, as described in detail below.

Inboard sealing assembly 110 also includes a retaining ring 140 formed as a generally tubular structure from any suitable material, such as metal, using any suitable method, such as stamping. Retaining ring 140 includes an inboard flange 142, a cylindrical body 143, and an outboard flange 144. Inboard flange 142 extends radially-inward from the inboard end of body 143 and has an inner diameter that is less than the inner diameter of the body. The outer diameter of body 143 generally corresponds to and is less than or equal to the inner diameter of projection 138. Outboard flange 144 extends radially-outward from the outboard end of body 143 and has an outer diameter that is greater than the outer diameter of the body and the inner diameter of projection 138. Retaining ring 140 may engage with or be disposed through opening 136 of seal 130 and at least partially within projection 138 such that outboard flange 144 contacts or mechanically engages the inner surface of concavity 132 of the seal, limiting or preventing axially-inboard movement of the retaining ring.

In accordance with another important aspect of the present invention, sensor arrangement 150 is at least partially mounted within seal 130 inboardly of slack adjuster 102 and engages inboard end 84 of camshaft 86 of the drum brake system. As a result, sensor arrangement 150 is disposed away from the brake drum (not shown) of the drum brake system in an area that is not exposed to extreme temperatures. Sensor arrangement 150 includes a detector, such as an eddy current sensor 152, and a non-magnetized target 154. Sensor 152 may be powered using any suitable method, such as a battery, direct wired transmission, and/or local energy harvesting, as is known. Sensor 152 may send and receive information via electronic signals using any suitable method, such as direct wired transmission or wireless RF, to or from a central processing unit or nearby receiver in communication with a remote management system, as is known. Sensor 152 is disposed within retaining ring 140 such that the outer surface of at least a portion of the sensor contacts or forms an interface with the inner surface of the retaining ring. In particular, the inner diameters of inboard flange 142 and body 143 of retaining ring 140 generally correspond to the outer diameter of at least a portion of sensor 152 such that the inboard flange limits or restricts axially-inboard movement of the sensor but allows relative rotation between the sensor and the retaining ring during braking.

Target 154 may be mounted on or attached to inboard end 84 of camshaft 86 in any suitable manner, such as a press-fit connection. More specifically, target 154 may mechanically engage with, such as by press-fit, a central opening 88 extending outboardly into camshaft 86 from inboard end 84. Target 154 may have any suitable angular or rotational orientation, such as relative to a narrow point starting location, or throat, or a maximum radial point location, or tips, on an S-cam (not shown) of the drum brake system. Target 154 may be formed with an inboard surface 156 (FIG. 2) having any suitable shape and/or may include any suitable pattern (see, e.g., FIGS. 2-3). Inboard surface 156 may be oriented to face inboardly such that the inboard surface interacts or forms an interface with the outboard end of sensor 152, allowing the sensor to detect and determine the degree of angular rotation of camshaft 86. A low-force spring 158 may be disposed about sensor 152 and between the sensor and inboard flange 142 of retaining ring 140. Spring 158 maintains sensor 152 within a minimum distance of target 154 during operation of the heavy-duty vehicle in the event camshaft 86 and slack adjuster 102 potentially experience axial movement. Sensor arrangement 150 also includes a reference arm 160 formed from any suitable material, such as metal, by any suitable method, such as stamping. Reference arm 160 may be relatively straight or may be formed with one or more bends or joints, as is known. Reference arm 160 may connect sensor 152 to an anti-rotation pin 90 of the drum brake system or axle/suspension system. More particularly, reference arm 160 may be formed with an opening 162 at one end of the reference arm that aligns with an opening 153 formed in the inboard end of sensor 152. A fastener 163 may be disposed through the aligned openings 162, 153 of reference arm 160 and sensor 152, respectively, to attach the reference arm to the sensor. Reference arm 160 may be formed with another opening 164 formed through another, opposite end of the reference arm. A suitable anti-vibration structure, such as rubber or plastic grommet 166, may be disposed within and about opening 164, engaging reference arm 160. Anti-rotation pin 90 may be disposed through grommet 166 and opening 164 in a slip-fit manner to connect reference arm 160, and thus sensor 152, to the pin, preventing rotation of the sensor relative to target 154 and slack adjuster 102. Anti-rotation pin 90 may be rigidly mounted to a component (not shown), such as a beam (not shown) of an axle/suspension system (not shown) or any other suitable structure on an axle (not shown) or other component of the drum brake system. It is contemplated that anti-rotation pin 90 may also be used by a reference control arm (not shown) of slack adjuster 102, as is known.

It is also contemplated that sensor 152 may be adjustable relative to reference arm 160 in order to allow setting of a reference point relative any other angular position suitable for determining rotation of the S-cam.

Alternatively, it is contemplated that sensor arrangement 150 may not include reference arm 160. In such a configuration, sensor 152 may be disposed within retaining ring 140, as described above, such that relative axial movement, but not relative rotation, may occur between the sensor and the retaining ring. In addition, retaining ring 140 may be disposed through opening 136 of seal 130 and at least partially within and affixed to projection 138 such that relative rotation between the projection and the retaining ring cannot occur. Similarly, at least a portion of projection 138 may be disposed within and/or mechanically engage opening 126 of cover 120 and be fixed using any suitable method, such as adhesive, within collar 128 such that relative rotation between the collar and the projection, and, therefore, between seal 130 and the cover, cannot occur. As a result of this configuration, the reference point of sensor 152 relative to the S-cam of the drum brake system may be set by rotating cover 120 relative to slack adjuster 102 prior to attachment of the cover to the slack adjuster to maintain the selected orientation.

During assembly of slack adjuster assembly 100, target 154 of sensor arrangement 150 is oriented relative to the S-cam and attached to inboard end 84 of camshaft 86. Projection 138 of seal 130 is inserted through opening 126 in flange 124 of cover 120 such that the projection is at least partially disposed within and/or engages collar 128 and lip 139 mechanically engages the inboard end of the collar. It is also contemplated that projection 138 may be attached to collar 128 using any suitable method, such as adhesive, to prevent relative rotation between the projection and the collar. Spring 158 is disposed about sensor 152 before the sensor is disposed within retaining ring 140. Inboard flange 142 of retaining ring 140 contacts spring 158 to restrict axially-inboard movement of sensor 152. It is also contemplated that sensor 152 may be attached to or engage retaining ring 140 such that the retaining ring limits axial movement while allowing rotation of the sensor relative to the retaining ring. Retaining ring 140 with sensor 152 may then be disposed within concavity 132 of seal 130 and inserted through opening 136 such that the retaining ring is at least partially disposed within projection 138 and outboard flange 144 limits further axially-inboard movement of the retaining ring. It is contemplated that projection 138 may be attached or connected to retaining ring 140 to prevent relative rotation between the retaining ring and the projection. Alternatively, retaining ring 140 may be installed in seal 130 prior to insertion of sensor 152 and spring 158 into the retaining ring. Inboard sealing assembly 110 with sensor 152 of sensor arrangement 150 is then attached to slack adjuster 102. More specifically, outboard section 122 of cover 120 is inserted into recess 106 of the coverplate (not shown) or body 104 on the inboard side of slack adjuster 102 such that lip 134 of seal 130 is in contact with the slack adjuster.

Cover 120 may then be rotated in order to orient sensor 152 in a particular angular orientation before the cover is press-fit or attached to slack adjuster 102 using any other suitable manner. It is also contemplated that a threaded connection may be utilized between cover 120 and slack adjuster 102 to facilitate adjustment of the relative axial distance between lip 134 of seal 130 and the inboard side of body 104 of the slack adjuster independent of axial movement of camshaft 86 in order to maintain the 360-degree seal during braking.

Grommet 166 may be disposed in opening 164 of reference arm 160. Anti-rotation pin 90 may then be slidably disposed through grommet 166 and opening 164 until opening 162 of reference arm 160 is aligned with and adjacent to opening 153 of sensor 152. Fastener 163 may then be disposed through the aligned openings 162, 153 of reference arm 160 and sensor 152, respectively, to attach the reference arm to the sensor. Alternatively, reference arm 160 may not be utilized, as described above. Grease is then typically added to slack adjuster 102 using a pressurized grease gun (not shown) in order to lubricate internal and external splines 108, 87, respectively, of the slack adjuster and inboard end 84 of camshaft 86. Grease is injected into slack adjuster 102 such that the grease passes through internal and external splines 108, 87, respectively, and fills concavity 132 of seal 130, protecting the internal and external splines, sensor 152, and target 154 against the intrusion of water, chemicals, and/or debris, thereby reducing maintenance and extending the service-life of components of sensor arrangement 150, slack adjuster assembly 100, and the drum brake system.

Thus, slack adjuster assembly 100, according to the present invention, provides sensor arrangement 150 for monitoring rotation of camshaft 86 that can be utilized without regard to slack adjuster manufacturer and is minimally disruptive and/or does not add complexity to maintenance and assembly of the drum brake system. In addition, slack adjuster assembly 100 provides inboard sealing assembly 110 that maintains lubrication of slack adjuster 102 and camshaft 86 while protecting sensor arrangement 150 from potential impact damage, extreme temperatures, water, chemicals, and/or debris, thereby increasing the maintenance interval and service-life of the sensor arrangement and slack adjuster assembly and reducing heavy-duty vehicle down-time.

Figure 4:
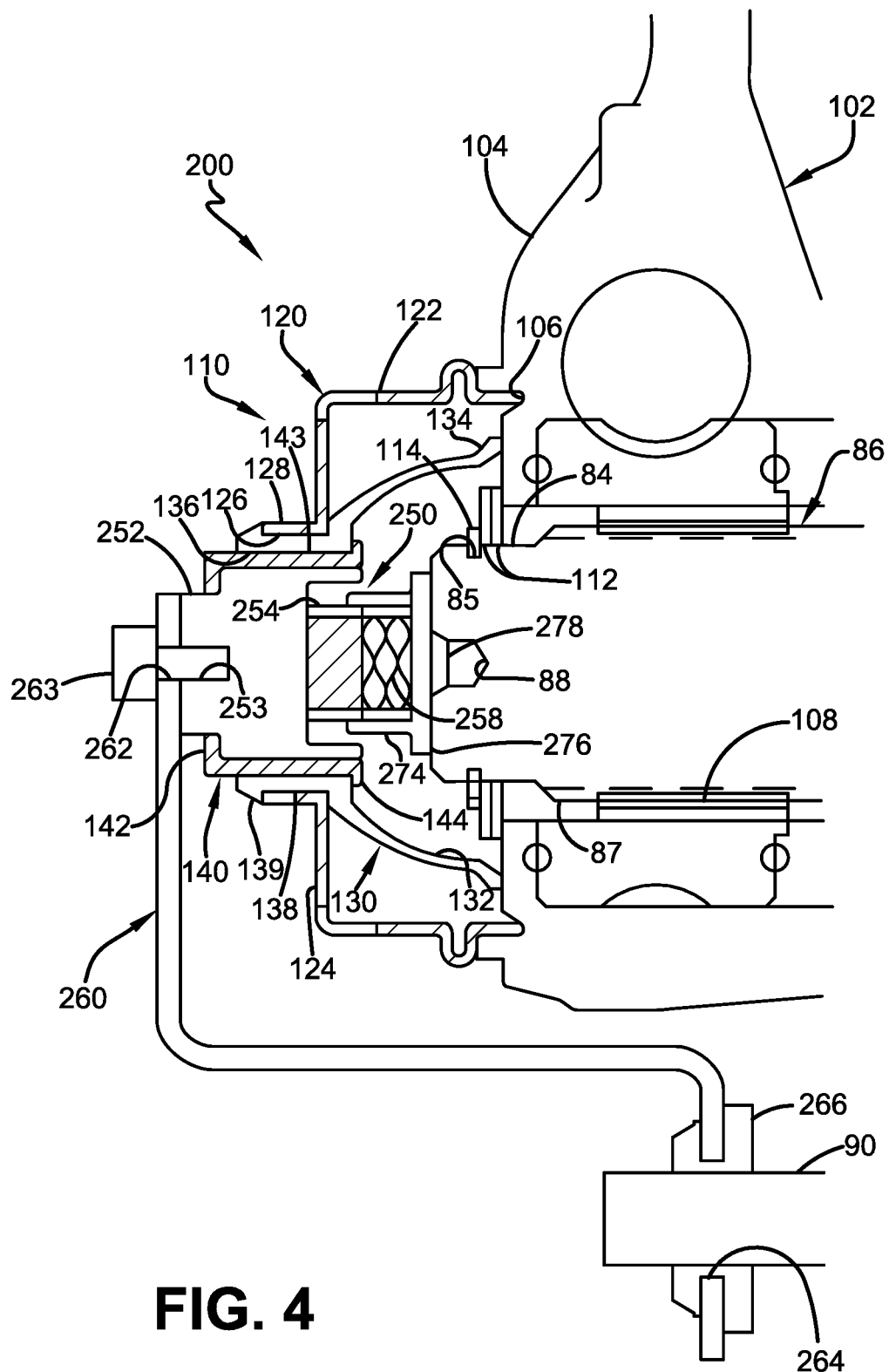
FIG. 4 is a fragmentary elevational view, in section, of another exemplary embodiment slack adjuster assembly, according to the present invention.

Another exemplary embodiment slack adjuster assembly 200 (FIG. 4), according to the present invention, may be incorporated into any drum brake system (not shown). Slack adjuster assembly 200 is similar in construction and arrangement to slack adjuster assembly 100 described above. As a result, the description below will be primarily directed to the differences between slack adjuster assembly 200 and slack adjuster assembly 100.

Slack adjuster assembly 200 includes inboard sealing assembly 110, described above, and a sensor arrangement 250. Sensor arrangement 250 is at least partially mounted within seal 130 of sealing assembly 110 and engages inboard end 84 of a camshaft 86 of the drum brake system.

As a result, sensor arrangement 250 is disposed away from the brake drum (not shown) of the drum brake system in an area that is not exposed to extreme temperatures. Sensor arrangement 250 includes a detector, such as a Hall effect sensor 252, and a diametrically-polarized target 254. Sensor 252 may be powered using any suitable method, such as a battery, direct wired transmission, and/or local energy harvesting, as is known. Sensor 252 may send and receive information via electronic signals using any suitable method, such as direct wired transmission or wireless RF, to or from a central processing unit or nearby receiver in communication with a remote management system, as is known. Sensor 252 is disposed within retaining ring 140 such that the outer surface of at least a portion of the sensor contacts or forms an interface with the inner surface of the retaining ring. In particular, the outer diameter of at least a portion of sensor 252 generally corresponds to and is less than or equal to the inner diameter of body 143 and/or inboard flange 142 of retaining ring 140 such that the inboard flange limits or restricts axially-inboard movement of the sensor. Sensor 252 may be disposed within retaining ring 140 such that relative rotation between the sensor and the retaining ring can occur during braking.

Target 254 may be indirectly mounted on or attached to inboard end 84 of camshaft 86 using any suitable means, such as a press-fit connection. In particular, target 254 may be slidably disposed within and form an interface with a generally cylindrical receptacle 274. More particularly, receptacle 274 may be formed with an outboard plate 276 having a surface feature or projection 278 that extends axially outboard to mechanically engage with, such as by press-fit, opening 88 of inboard end 84 of camshaft 86. Receptacle 274 and/or target 254 may be formed with any suitable shape or surface feature along the interface between the target and receptacle to prevent relative rotation and may permit only one rotational orientation or two symmetrical rotational orientations between the target and the receptacle. Receptacle 274 may have any suitable angular or rotational orientation, such as relative to a narrow point starting location, or throat, or a maximum radial point location, or tips, on an S-cam (not shown) of the drum brake system. A low-force spring 258 may be disposed within receptacle 274 between plate 276 and target 254 to maintain close proximity between the target and sensor 252 during operation of the heavy-duty vehicle in the event camshaft 86 and slack adjuster 102 potentially experience axial movement.

Sensor arrangement 250 also includes a reference arm 260 formed from any suitable material, such as metal, using any suitable method, such as stamping. Reference arm 260 may be relatively straight or may be formed with one or more bends or joints, as is known. Reference arm 260 connects sensor 252 to anti-rotation pin 90 of the drum brake system. More particularly, an opening 262 at one end of reference arm 260 aligns with an opening 253 formed in the inboard end of sensor 252. A fastener 263 is disposed through the aligned openings 262, 253 of reference arm 260 and sensor 252, respectively, to attach the reference arm to the sensor. Reference arm 260 includes another opening 264 at another, opposite end. A rubber or plastic grommet 266 or other suitable anti-vibration structure may be disposed within and about opening 264 for engaging reference arm 260. Anti-rotation pin 90 is disposed through grommet 266 and opening 264 in a slip-fit manner to connect the reference arm, and thus sensor 252, to the pin, preventing rotation of the sensor relative to target 254 and slack adjuster 102. It is contemplated that sensor 252 may be adjustable relative to reference arm 260 in order to allow setting of a reference point relative any other angular position suitable for determining rotation of the S-cam.

Alternatively, sensor arrangement 250 may not include reference arm 260, as described above. In such a configuration, sensor 252 may be disposed within retaining ring 140 such that relative rotation between the sensor and the retaining ring does not occur. In addition, retaining ring 140 may be disposed through opening 136 of seal 130 and be disposed at least partially within and affixed to projection 138 such that relative rotation between the projection and the retaining ring cannot occur. Similarly, at least a portion of projection 138 may be disposed within and/or through opening 126 and/or mechanically engage or be fixed using any suitable method within collar 128 of cover 120 such that relative rotation between the collar and the projection, and, therefore, between seal 130 and the cover, cannot occur. Thus, in such a configuration, cover 120 may be rotated relative to slack adjuster 102 to set the reference point of sensor 252 relative to the S-cam of the drum brake system prior to attachment of the cover to the slack adjuster to maintain the selected orientation. It is also contemplated that, in such a configuration, inboard sealing assembly 110 may not include retaining ring 140 such that sensor 152 may instead be disposed within projection 138 of seal 130.

Thus, slack adjuster assembly 200, according to the present invention, provides sensor arrangement 250 for monitoring rotation of camshaft 86 that can be utilized without regard to slack adjuster manufacturer and is minimally disruptive and/or does not add complexity to maintenance and assembly of the drum brake system. In addition, slack adjuster assembly 200 utilizes inboard sealing assembly 110 that maintains lubrication of slack adjuster 102 and camshaft 86 while protecting sensor arrangement 250 from potential impact damage, extreme temperatures, water, chemicals, and/or debris, thereby increasing the maintenance interval and service-life of the sensor arrangement and slack adjuster assembly and reducing heavy-duty vehicle down time.

Figure 5:
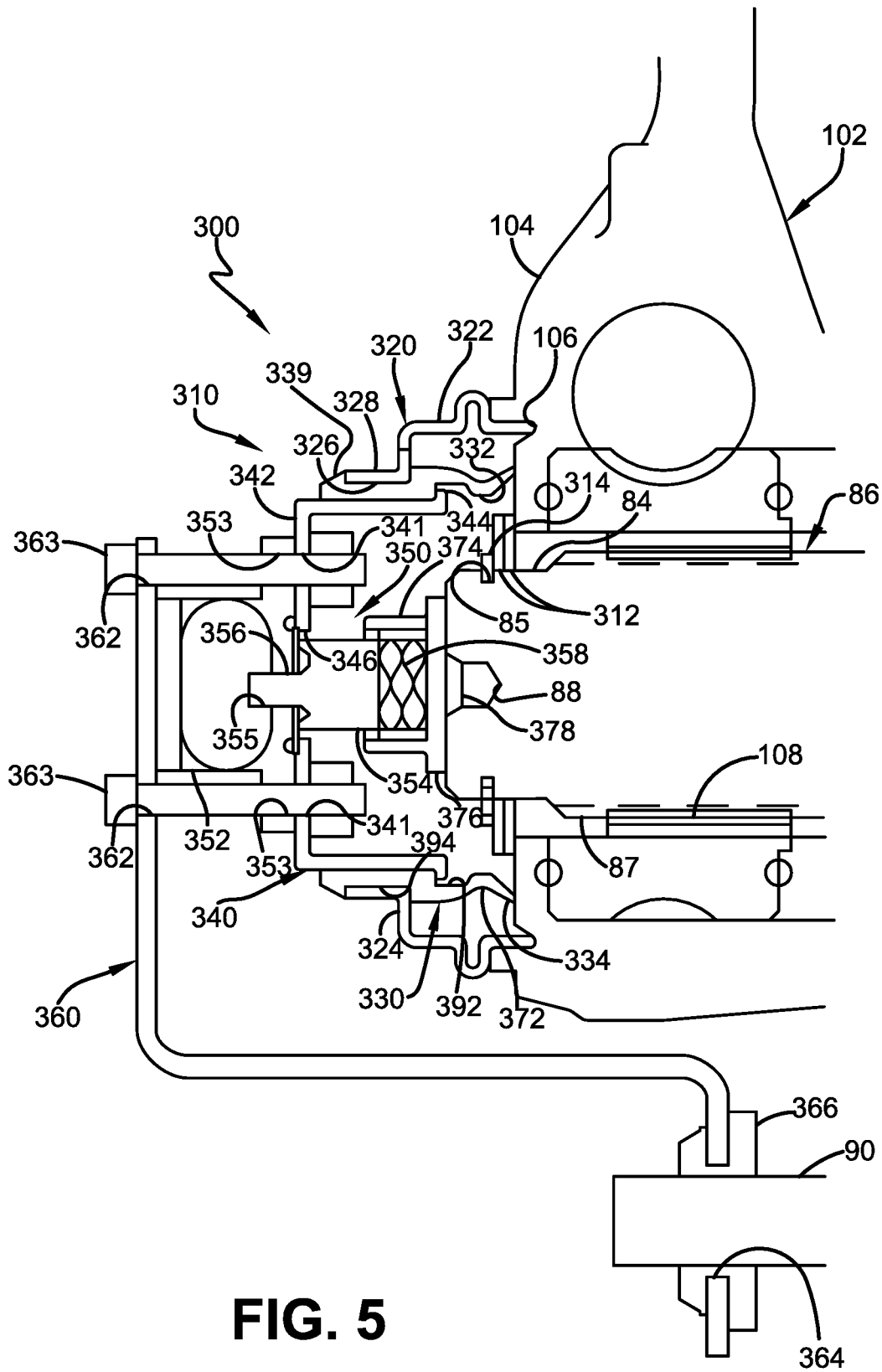
FIG. 5 is a fragmentary elevational view, in section, of yet another exemplary embodiment slack adjuster assembly, according to the present invention.

Yet another exemplary embodiment slack adjuster assembly 300 (FIG. 5), according to the present invention, may be incorporated into any drum brake system (not shown). Slack adjuster assembly 300 is similar in construction and arrangement to slack adjuster assemblies 100, 200 described above. As a result, the description below will be primarily directed to the differences between slack adjuster assembly 300 and slack adjuster assemblies 100, 200.

Slack adjuster assembly 300 includes inboard sealing assembly 310 and sensor arrangement 350. Inboard sealing assembly 310 is sealingly engaged with the inboard side of slack adjuster 102. Inboard sealing assembly 310 includes one or more washers 312, a snap ring or E-clip 314, a seal 330, and a cap or cover 320. Washers 312 may be disposed about inboard end 84 of camshaft 86 outboardly of groove 85. E-clip 314 is snapped onto, or disposed about, inboard end 84 of camshaft 86 inboardly of washers 312. More particularly, E-clip 314 mechanically engages inboard end 84 of camshaft 86 such that the E-clip is disposed within groove 85 and acts as a retaining ring to limit the amount of axial movement of washers 312, slack adjuster 102, and the camshaft.

Seal 330 is disposed over inboard end 84 of camshaft 86 and is in contact with body 104 of slack adjuster 102 to form a 360-degree seal on the inboard side of the slack adjuster. Seal 330 is formed from a flexible elastomeric material, such as rubber, with a generally tubular shape forming a generally cylindrical opening or cavity 332. A large-diameter flap or lip 334 is formed about the outboard end of seal 330 and is in contact with a coverplate (not shown) or body 104 of slack adjuster 102 to form a 360-degree seal about the inboard side of the slack adjuster. An annular rib 372 is formed adjacent lip 334 and projects radially-inward from the outer surface of seal 330. As a result, lip 334 may extend radially outwardly and axially outboard toward body 104 of slack adjuster 102 at an oblique angle. Rib 372 of seal 330 combined with the flexible elastomer material of the seal prevents the seal from pulling a vacuum within cavity 332 or pressurizing the opening in the event axial movement of camshaft 86 occurs during braking. More particularly, in the event of axial movement of camshaft 86 during braking, rib 372 allows seal 330 to flex, compensating for any volume changes within cavity 332, thereby preventing suction of water, chemicals, and/or other debris past lip 334 into the concavity as well as preventing increased pressure from purging grease past the lip and out of the cavity. Seal 330 may also be formed with an annular inner groove 392, an annular outer groove 394, and an inboard flange or lip 339. Inner groove 392 is formed into and extends radially outward from the inner surface of seal 330 axially adjacent rib 372. Outer groove 394 is formed into and extends radially inward from the outer surface of seal 330 axially adjacent inner groove 392. Generally, the outer diameter of outer groove 394 may be less than the outer diameter of inner groove 392. The inner diameter of outer groove 394 may be less than the inner diameter of inner groove 392. Inboard lip 339 extends radially outward from seal 330 and is formed about the inboard end of cavity 332 of the seal axially adjacent outer groove 394.

Cover 320 of inboard sealing assembly 310 is formed with a stepped or graduated shape from any suitable material, such as steel, plastic, or composite, using any suitable process, such as stamping. Cover 320 may be formed with a generally cylindrical outboard section 322 and an inboard flange 324. Outboard section 322 may mechanically engage with the inboard side of slack adjuster 102. More specifically, outboard section 322 may be press-fit into annular recess 106 formed into a coverplate (not shown) or body 104 on the inboard side of slack adjuster 102. It is contemplated that any other suitable method of connection or attachment may be used between cover 320 and slack adjuster 102, such as a threaded connection. Inboard flange 324 extends radially inward from the inboard end of outboard section 322. An annular flange or collar 328 is formed continuous with and extends axially-inboard from inboard flange 324 such that the collar is radially offset from and concentric with or parallel to outboard section 322. Collar 328 defines an opening 326 extending through cover 320. The inner diameter of collar 328 generally corresponds to and is greater than or equal to the outer diameter of outer groove 394 of seal 330. It is contemplated that cover 320 may also include a plurality of vents (not shown) formed through flange 324 and having a suitable size and/or shape to provide protection to seal 330 and sensor arrangement 350 from damage potentially caused by power washers while allowing pressure equalization between the interior and exterior of the cover. As a result, air and/or grease may be purged from within seal 330 without creating back pressure, and water, chemicals, and/or debris may drain from cover 320, preventing collection inside the cover.

Seal 330 may be connected to or engage with cover 320. More specifically, at least a portion of seal 330 may be disposed within and/or through and/or mechanically engage with opening 326 and/or collar 328 of cover 320 such that outer groove 394 may be in contact with the inner surface of the collar. Lip 339 may mechanically engage the inboard edge of collar 328 to secure seal 330 to cover 320. It is also contemplated that any other suitable method may be used to connect or engage seal 330 with cover 320, such as adhesive. Engagement of seal 330 to cover 320 may facilitate control and adjustment of the contact pressure of lip 334 against the inboard side of slack adjuster 102, as described in further detail below.

Inboard sealing assembly 310 also includes a retaining ring 340 formed as a generally tubular structure from any suitable material, such as metal, using any suitable method, such as stamping. The outer diameter of retaining ring 340 generally corresponds to and is less than or equal to the inner diameter of outer groove 394 of seal 330. Retaining ring 340 includes an outboard flange 344 that extends radially-outward from the outboard end of the retaining ring. The outer diameter of outboard flange 344 is greater than the inner diameter of outer groove 394.

Retaining ring 340 may also be formed with an inboard flange 342 that extends radially inward from the inboard end of the retaining ring to form a central opening 346. Retaining ring 340 may engage with or be at least partially disposed within cavity 332 of seal 330 such that outboard flange 344 contacts or mechanically engages inner groove 392 of the seal, limiting or preventing axially inboard movement of the retaining ring while allowing relative rotation between the seal and the retaining ring.

In accordance with another important aspect of the present invention, sensor arrangement 350 is at least partially mounted within seal 330 and engages inboard end 84 of a camshaft 86 of the drum brake system. As a result, sensor arrangement 350 is disposed away from the brake drum (not shown) of the drum brake system in an area that is not exposed to extreme temperatures. Sensor arrangement 350 includes a detector, such as a rotary sensor 352. Sensor 352 may be powered using any suitable method, such as a battery, direct wired transmission, and/or local energy harvesting, as is known. Sensor 352 may send and receive information via electronic signals using any suitable method, such as direct wired transmission or wireless RF, to or from a central processing unit or nearby receiver in communication with a remote management system, as is known. Sensor 352 may be attached to inboard flange 342 of retaining ring 340. More specifically, a portion of sensor 352 may be disposed inboardly of and piloted into opening 346 of retaining ring 340. Sensor 352 may be attached, such as by a plurality of fasteners 363 to the inboard side of inboard flange 342 of retaining ring 340, as described in detail below.

Sensor arrangement 350 also includes a D-shaft 354 that is indirectly attached to inboard end 84 of camshaft 86 and engages with sensor 352. In particular, D-shaft 354 may be slidably disposed within and form an interface with a generally cylindrical receptacle 374. More particularly, receptacle 374 is formed with an outboard plate 376 having a surface feature or projection 378 that extends axially outboard to mechanically engage, such as by press-fit, opening 88 of inboard end 84 of camshaft 86. Receptacle 374 and/or D-shaft 354 may be formed with any suitable shape or circumferential surface feature along the interface between the D-shaft and the receptacle to prevent relative rotation and may permit only one rotational orientation or two symmetrical rotational orientations between the D shaft and receptacle. Receptacle 374 may have any suitable angular or rotational orientation, such as relative to a narrow point starting location, or throat, or a maximum radial point location, or tips, on an S-cam (not shown) of the drum brake system. D-shaft 354 may also be formed with an inboardly projecting extension 356 that is disposed within and/or engages with a bore 355 of sensor 352. A low-force spring 358 may be disposed within receptacle 374 between plate 376 and D-shaft 354 to ensure extension 356 remains disposed within bore 355 of sensor 352 during operation of the heavy-duty vehicle in the event camshaft 86 and slack adjuster 102 potentially experience axial movement.

Sensor arrangement 350 also includes a reference arm 360 formed from any suitable material by any suitable method. Reference arm 360 may be relatively straight or may be formed with one or more bends or joints, as is known. Reference arm 360 may connect sensor 352 to anti-rotation pin 90 of the drum brake system. More particularly, one or more openings 362 may be formed through one end of reference arm 360 and align with one or more openings 353 formed through sensor 352. Openings 353 of sensor 352, in turn, align with one or more openings 341 formed through inboard flange 342 of retaining ring 340. Fasteners 363 are disposed through the aligned openings 362, 353, 341 of reference arm 360, sensor 352, and retaining ring 340, respectively, to attach the reference arm to the sensor and the retaining ring. Reference arm 360 includes an opening 364 formed through another, opposite end. A rubber or plastic grommet 366 or other suitable anti-vibration structure may be disposed within and about opening 364 for engaging reference arm 360. Anti-rotation pin 90 is disposed through grommet 366 and opening 364 in a slip-fit manner to connect the reference arm, and thus sensor 352 and retaining ring 340, to the pin, preventing rotation of the sensor and retaining ring relative to slack adjuster 102. Anti-rotation pin 90 may be rigidly mounted to a component (not shown), such as a beam (not shown) of an axle/suspension system (not shown) or any other suitable structure on an axle (not shown) or component of the drum brake system. It is contemplated that anti-rotation pin 90 may also be used by a reference control arm (not shown) of slack adjuster 102, as is known. It is also contemplated that sensor 352 may be adjustable relative to reference arm 360 in order to allow setting of a reference point relative any other angular position suitable for determining rotation of the S-cam.

Alternatively, sensor arrangement 350 may not include reference arm 360. In such a configuration, sensor 352 may be attached to retaining ring 340 such that relative axial movement, but not relative rotation, may occur between the sensor and the retaining ring. In addition, retaining ring 340 may be affixed to seal 330 such that relative rotation between the seal and the retaining ring cannot occur. Similarly, at least a portion of outer groove 394 of seal 330 may be fixed using any suitable means, such as adhesive, within collar 328 of cover 320 such that relative rotation between the collar and the outer groove, and, therefore, between the seal and the cover, cannot occur. Thus, in such a configuration, cover 320 may be rotated relative to slack adjuster 102 to set the reference point of sensor 352 relative to the S-cam of the drum brake system prior to attaching the cover to the slack adjuster to maintain the selected orientation.

Thus, slack adjuster assembly 300, according to the present invention, provides sensor arrangement 350 for monitoring rotation of camshaft 86 that can be utilized without regard to slack adjuster manufacturer and is minimally disruptive and/or does not add complexity to maintenance and assembly of the drum brake system. In addition, slack adjuster assembly 300 utilizes inboard sealing assembly 310 that maintains lubrication of slack adjuster 102 and camshaft 86 while protecting sensor arrangement 350 from potential impact damage, extreme temperatures, water, chemicals, and/or debris, thereby increasing the maintenance interval and service-life of the sensor arrangement and slack adjuster assembly and reducing heavy-duty vehicle down time.

Figure 6:
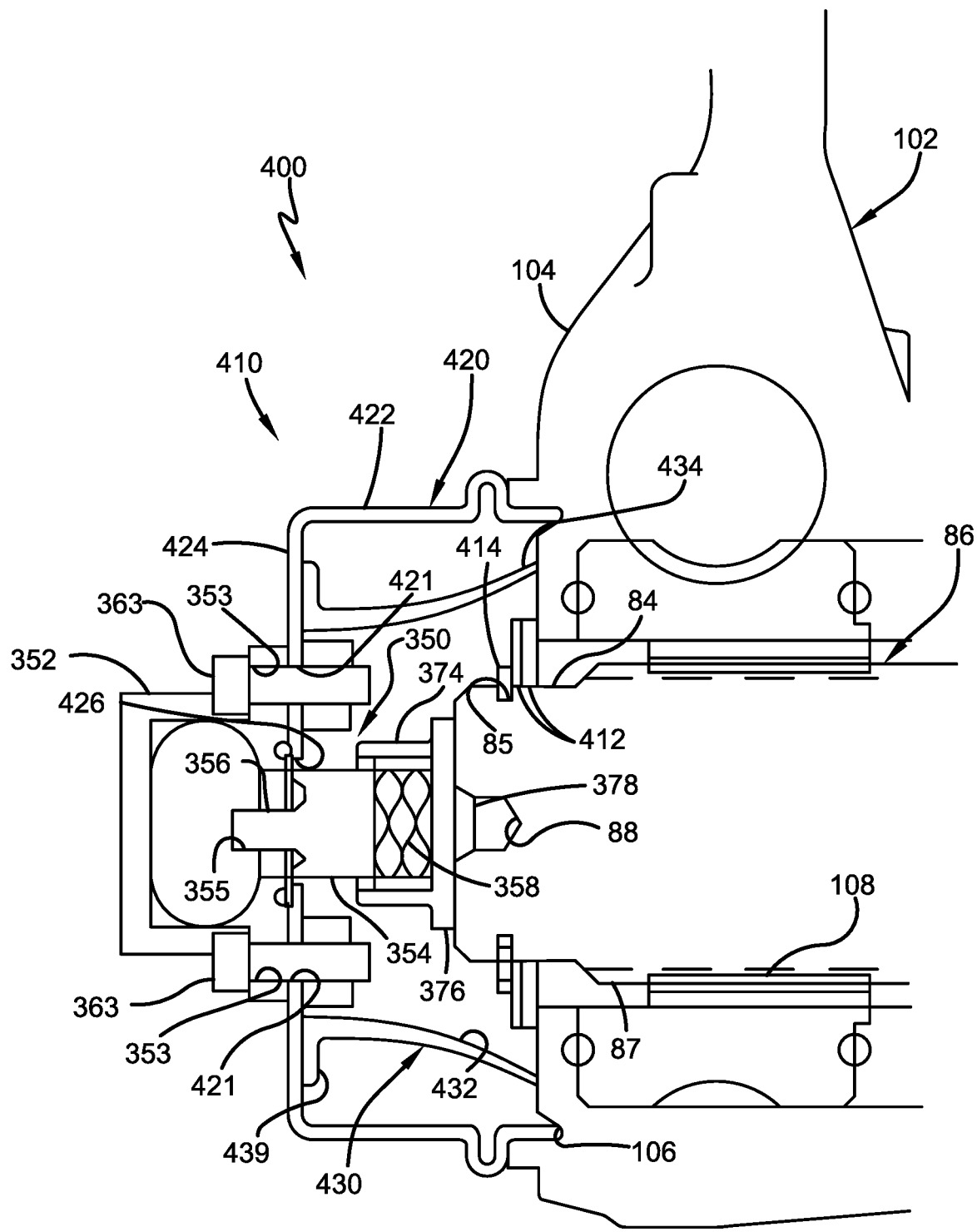
FIG. 6 is a fragmentary elevational view, in section, of still yet another exemplary embodiment slack adjuster assembly, according to the present invention. Similar reference characters refer to similar parts throughout.

Another exemplary embodiment slack adjuster assembly 400 (FIG. 6), according to the present invention, may be incorporated into any drum brake system (not shown). Slack adjuster assembly 400 is similar in construction and arrangement to slack adjuster assembly 300 described above. As a result, the description below will be primarily directed to the differences between slack adjuster assembly 400 and slack adjuster assembly 300.

Slack adjuster assembly 400 includes an inboard sealing assembly 410 and sensor arrangement 350, described above. Inboard sealing assembly 410 is sealingly engaged with the inboard side of slack adjuster 102 and includes one or more washers 412, a snap ring or E-clip 414, a seal 430, and a cap or cover 420. Washers 412 may be disposed about inboard end 84 of camshaft 86 outboardly of groove 85. E-clip 414 is snapped onto, or disposed about, inboard end 84 of camshaft 86 inboardly of washers 412. More specifically, E-clip 414 mechanically engages inboard end 84 of camshaft 86 such that the E-clip is disposed within groove 85 and acts as a retaining ring to limit the amount of axial movement of washers 412, slack adjuster 102, and the camshaft.

Seal 430 is disposed over inboard end 84 of camshaft 86 and is in contact with body 104 of slack adjuster 102 to form a 360-degree seal on the inboard side. Seal 430 is formed from a flexible elastomeric material, such as rubber, with a generally tubular, frustoconical shape forming an opening or cavity 432. An inboard flange 439 may be formed about the inboard end of cavity 432 and extend radially outward from seal 430. In addition, a large-diameter flap or lip 434 is formed about the outboard edge of cavity 432 and is in contact with a coverplate (not shown) or body 104 of slack adjuster 102 to form a 360-degree seal about the inboard side of the slack adjuster. As a result, pressurized grease may pool within cavity 432 as it flows between internal and external splines 108, 87 of slack adjuster 102 and camshaft 86, respectively, and through washers 412 and E-clip 414 to form a grease reservoir about and adjacent to sensor arrangement 350 and components of slack adjuster assembly 400 to prevent wear and corrosion. The large diameter of lip 434 combined with the flexible elastomer of seal 430 allows the lip to be displaced from cavity 432. More specifically, in the event grease overfills cavity 432, lip 434 may deflect radially outwardly and inboardly away from slack adjuster 102, allowing excess grease to be purged from the cavity. The frustoconical shape of seal 430 combined with the flexible elastomer material of the seal also prevents the seal from pulling a vacuum on cavity 432 or pressurizing the cavity in the event axial movement of camshaft 86 occurs during braking. More particularly, in the event of axial movement of camshaft 86 during braking, seal 430 may flex, compensating for any volume changes within cavity 432, thereby preventing suction of water, chemicals, and/or other debris past lip 434 into the cavity as well as preventing increased pressure from purging grease past lip 434 and out of the cavity.

Cover 420 of inboard sealing assembly 410 is formed from any suitable material, such as steel, plastic, or composite, using any suitable process, such as stamping, as a generally cylindrical shape having an outboard section 422 and an inboard flange 424. Outboard section 422 may mechanically engage with the inboard side of slack adjuster 102. More specifically, outboard section 422 may be press-fit into annular recess 106 formed into a coverplate (not shown) or body 104 on the inboard side of slack adjuster 102. It is contemplated that any other suitable method of connection or attachment may be used between cover 420 and slack adjuster 102, such as a threaded connection. Inboard flange 424 extends radially inward from the inboard end of outboard section 422 and includes a central opening 426. Inboard flange 424 also includes a plurality of openings 421 for receiving fasteners 363 to attach sensor 352 to cover 420. It is contemplated that cover 420 may also include a plurality of vents (not shown) formed through flange 424 or outboard section 422 and having a suitable size and/or shape to provide protection to seal 430 and sensor arrangement 450 from damage potentially caused by power washers while allowing pressure equalization between the interior and exterior of the cover. As a result, air and/or grease may be purged from concavity 432 of seal 430 without creating back pressure and water, chemicals, and/or debris may drain from cover 420, preventing collection inside the cover.

Seal 430 may be connected to, or mechanically engage with, cover 420. More specifically, inboard flange 439 of seal 430 may be attached, such as by adhesive, to the outboard side of inboard flange 424 of cover 420. Alternatively, inboard flange 439 and the outboard side of inboard flange 424 of cover 420 may have any suitable, reciprocal formations (not shown) that allow the inboard flange of the seal to be molded to or otherwise mechanically engage with the inboard flange of the cover. It is also contemplated that any other suitable method may be used to connect or engage seal 430 with cover 420. Engagement of seal 430 to cover 420 may facilitate control and adjustment of the contact pressure of lip 434 against the inboard side of slack adjuster 102.

Thus, slack adjuster assembly 400, according to the present invention, provides sensor arrangement 350 for monitoring rotation of camshaft 86 that can be utilized without regard to slack adjuster manufacturer and is minimally disruptive and/or does not add complexity to maintenance and assembly of the drum brake system. In addition, slack adjuster assembly 400 utilizes inboard sealing assembly 410 that maintains lubrication of slack adjuster 102 and camshaft 86 while protecting sensor arrangement 350 from potential impact damage, extreme temperatures, water, chemicals, and/or debris, thereby increasing the maintenance interval and service-life of the sensor arrangement and slack adjuster assembly and reducing heavy-duty vehicle down time.

It is contemplated that slack adjuster assemblies 100, 200, 300, 400 according to the present invention, could be formed from any suitable material, including but not limited to composites, metal, and the like, without changing the overall concept or operation of the present invention. It is also contemplated that slack adjuster assemblies 100, 200, 300, 400 of the present invention could be utilized in drum brake systems on heavy-duty vehicles having more than one axle and/or one or more than one wheel per wheel end assembly, without changing the overall concept or operation of the present invention. It is further contemplated that slack adjuster assemblies 100, 200, 300, 400 of the present invention could be utilized with all types of heavy-duty vehicle drum brake systems without changing the overall concept or operation of the present invention.

It is contemplated that different arrangements and materials of inboard sealing assemblies 110, 310, 410, other than those shown and described, could be utilized without changing the overall concept or operation of the present invention, so long as they achieve a 360-degree seal on the inboard side of slack adjuster 102 that prevents grease back pressure while providing protection for sensor arrangements 150, 250, 350 from impact damage, extreme temperatures, water, chemicals, and/or debris. Similarly, inboard sealing assemblies 110, 310, 410, including seals 130, 330, 430 and covers 120, 320, 420, could have different configurations without changing the overall concept or operation of the present invention. It is also contemplated that sensor arrangements 150, 250, 350 could utilize other types of angular or rotation sensors, other than those shown and described, such as anisotropic magnetoresistance sensors, variable resistant sensors, or potentiometers, without changing the overall concept or operation of the present invention.

Accordingly, the slack adjuster assemblies of the present invention are simplified; provide an effective, safe, inexpensive, and efficient structure and method, which achieve all the enumerated objectives; provide for eliminating difficulties encountered with prior art slack adjuster assemblies; and solve problems and obtain new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the slack adjuster assemblies are used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A slack adjuster assembly for use in a heavy-duty vehicle drum brake system, the slack adjuster assembly comprising:
   a slack adjuster mounted on an inboard end of a camshaft of said drum brake system;
   an inboard sealing assembly sealingly engaged with the exterior surface of an inboard side of a body of said slack adjuster;
   a sensor arrangement for measuring the rotation of said camshaft, said sensor arrangement being at least partially disposed within said inboard sealing assembly;
   whereby said inboard sealing assembly protects said sensor arrangement from impact damage, water, chemicals, and debris.

2. The slack adjuster assembly of claim 1, said inboard sealing assembly further comprising a cover and a seal, said seal being at least partially disposed within said cover to protect said seal from impacts, said cover engaging with said inboard side of said slack adjuster.

3. The slack adjuster assembly of claim 2, said cover matingly engaging with said inboard side of said slack adjuster via threaded connection.

4. The slack adjuster assembly of claim 2, said seal being formed with a radially flexing rib that provides axial compression and extension of the seal.

5. The slack adjuster of claim 2, said seal being formed from an elastomeric material and having a bell-shape with a concavity and an outboard lip, said seal being disposed over said inboard end of said camshaft, said lip being in contact with said inboard side of said slack adjuster, the inboard end of the camshaft being at least partially disposed within said concavity.

6. The slack adjuster assembly of claim 5, said contact between said lip and said inboard side of said slack adjuster being adjustable by the engagement of said cover with the inboard side of the slack adjuster.

7. The slack adjuster assembly of claim 5, said sensor arrangement further comprising a sensor and a target, said sensor being at least partially disposed within said concavity of said seal, said target being attached to said inboard end of said camshaft.

8. The slack adjuster assembly of claim 7, said sensor arrangement further comprising a spring, said spring maintaining a distance between said target and said sensor in the event of axial movement of said camshaft.

9. The slack adjuster assembly of claim 7, said sensor arrangement further comprising a retaining ring disposed about said sensor and at least partially projecting inboardly from said seal.

10. The slack adjuster assembly of claim 7, said slack adjuster assembly further comprising a reference arm, said reference arm being connected to said sensor.

11. The slack adjuster assembly of claim 5, said sensor arrangement further comprising a rotary sensor connected to said inboard end of said camshaft by a D-shaft.

12. The slack adjuster assembly of claim 11, said slack adjuster assembly further comprising a reference arm, said reference arm being connected to said cover of said inboard sealing assembly.

13. A slack adjuster assembly for use in a heavy-duty vehicle drum brake system, the slack adjuster assembly comprising:
- a slack adjuster mounted on an inboard end of a camshaft of said drum brake system;
- an inboard sealing assembly sealingly engaged with the exterior surface of an inboard side of a body of said slack adjuster, said inboard sealing assembly having a cover and a seal, said seal being at least partially disposed within said cover to protect the seal from impacts, said cover engaging with said inboard side of said slack adjuster;
- a sensor arrangement for measuring the rotation of said camshaft, said sensor arrangement being at least partially disposed within the seal of the inboard sealing assembly;
- whereby said inboard sealing assembly protects said sensor arrangement from impact damage, water, chemicals, and debris.

14. A slack adjuster assembly for use in a heavy-duty vehicle drum brake system, the slack adjuster assembly comprising:
- a slack adjuster mounted on an inboard end of a camshaft of said drum brake system;
- an inboard sealing assembly sealingly engaged with an inboard side of said slack adjuster, said inboard sealing assembly including a cover and a seal, said seal being formed from an elastomeric material and having a bell-shape with a concavity and an outboard lip, the seal being disposed over said inboard end of said camshaft, said lip being in contact with said inboard side of said slack adjuster, the inboard end of the camshaft being at least partially disposed within the concavity, the seal being at least partially disposed within said cover to protect the seal from impacts, the cover engaging with the inboard side of the slack adjuster;
- a sensor arrangement for measuring the rotation of said camshaft, said sensor arrangement being at least partially disposed within said inboard sealing assembly;
- whereby said inboard sealing assembly protects said sensor arrangement from impact damage, water, chemicals, and debris.

15. The slack adjuster assembly of claim 14, said contact between said lip and said inboard side of said slack adjuster being adjustable by the engagement of said cover with the inboard side of the slack adjuster.

16. The slack adjuster assembly of claim 14, said sensor arrangement further comprising a sensor and a target, said sensor being at least partially disposed within said concavity of said seal, said target being attached to said inboard end of said camshaft.

17. The slack adjuster assembly of claim 16, said sensor arrangement further comprising a spring, said spring maintaining a distance between said target and said sensor in the event of axial movement of said camshaft.

18. The slack adjuster assembly of claim 16, said sensor arrangement further comprising a retaining ring disposed about said sensor and at least partially projecting inboardly from said seal.

19. The slack adjuster assembly of claim 16, said slack adjuster assembly further comprising a reference arm, said reference arm being connected to said sensor.

20. The slack adjuster assembly of claim 14, said sensor arrangement further comprising a rotary sensor connected to said inboard end of said camshaft by a D-shaft.

21. The slack adjuster assembly of claim 20, said slack adjuster assembly further comprising a reference arm, said reference arm being connected to said cover of said inboard sealing assembly.

\* \* \* \* \*